(12) United States Patent
Oberheim (10) Patent No.: US 8,549,762 B2
(45) Date of Patent: Oct. 8, 2013

(54) LINKAGE DRIVE MECHANISM FOR A RECIPROCATING TOOL

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 576 days.

(21) Appl. No.: 12/421,684

(22) Filed: Apr. 10, 2009

(65) Prior Publication Data

US 2009/0188119 A1 Jul. 30, 2009

Related U.S. Application Data

(63) Continuation-in-part of application No. 11/707,196, filed on Feb. 13, 2007, now Pat. No. 7,814,666.

(51) Int. Cl.
*B23D 49/10* (2006.01)

(52) U.S. Cl.
USPC .............................................. 30/392; 30/393

(58) Field of Classification Search
USPC ........................................... 30/392, 393, 394
See application file for complete search history.

(56) References Cited

U.S. PATENT DOCUMENTS

| | | | |
|---|---|---|---|
| 1,035,524 A | 8/1912 | Bradley | |
| 2,547,922 A | 4/1951 | Bechtold | |
| 2,601,788 A * | 7/1952 | Parker | 74/40 |
| 2,619,131 A | 11/1952 | Vulliet-Durand | |
| 2,619,174 A | 11/1952 | Neale | |
| 2,793,661 A * | 5/1957 | Olson | 30/393 |
| 3,155,128 A | 11/1964 | Godfrey | |
| 3,280,683 A * | 10/1966 | Alrik Djurberg | 83/454 |
| 3,945,120 A | 3/1976 | Ritz | |
| 4,320,678 A * | 3/1982 | Volk | 83/574 |
| 4,941,367 A | 7/1990 | Konves | |
| 4,989,488 A | 2/1991 | Potzsch | |
| 5,025,562 A | 6/1991 | Palm | |
| 5,063,807 A * | 11/1991 | Abel | 83/647 |
| 5,212,887 A | 5/1993 | Farmerie | |
| 5,369,887 A * | 12/1994 | Keevers | 30/394 |
| 5,450,925 A | 9/1995 | Smith et al. | |
| 5,479,840 A * | 1/1996 | Hilliard et al. | 83/477.2 |
| 5,555,626 A | 9/1996 | Fuchs | |
| 5,561,909 A * | 10/1996 | Berg et al. | 30/392 |
| 5,940,977 A | 8/1999 | Moores, Jr. | |
| 6,212,781 B1 * | 4/2001 | Marinkovich et al. | 30/394 |
| 6,249,979 B1 | 6/2001 | Bednar et al. | |
| 6,286,217 B1 | 9/2001 | Dassoulas | |
| 6,568,089 B1 | 5/2003 | Popik et al. | |
| 6,578,856 B2 * | 6/2003 | Kahle | 280/30 |

(Continued)

FOREIGN PATENT DOCUMENTS

| | | |
|---|---|---|
| CN | 1532016 | 9/2004 |
| DE | 3722542 | 1/1989 |

(Continued)

*Primary Examiner* — Kenneth E. Peterson
*Assistant Examiner* — Jennifer Swinney
(74) *Attorney, Agent, or Firm* — Maginot, Moore & Beck (57) ABSTRACT

Preferred embodiments of a reciprocating drive apparatus are disclosed that comprise a housing, a rotatable drive shaft assembly located in the housing an elongated plunger located in the housing for reciprocating motion, the plunger having a front end portion for attaching a tool thereto, a rotary joint rocker mechanism supported in the housing and operatively connected to the plunger and the drive shaft assembly so that rotation of the drive shaft assembly produces reciprocating motion of the plunger. Another preferred embodiment includes a reciprocating counterweight.

14 Claims, 9 Drawing Sheets

(56) References Cited

U.S. PATENT DOCUMENTS

| | | |
|---|---|---|
| 6,634,107 B2 | 10/2003 | Osada |
| 6,662,455 B2 | 12/2003 | Tachibana et al. |
| 6,688,005 B1 | 2/2004 | Tachibana et al. |
| 6,742,267 B2 | 6/2004 | Marinkovich et al. |
| 6,772,662 B2 | 8/2004 | Marinkovich et al. |
| 6,877,235 B2 | 4/2005 | Osada |
| 7,096,589 B2 | 8/2006 | Phillips et al. |
| 7,096,590 B2 | 8/2006 | Marinkovich et al. |
| 7,117,601 B2 | 10/2006 | Hai-Chun |
| 7,188,425 B2 | 3/2007 | Bednar et al. |
| 7,216,433 B2 | 5/2007 | Haas et al. |
| 7,278,646 B2 * | 10/2007 | Chuang ............ 280/47.34 |
| 7,331,407 B2 | 2/2008 | Stirm et al. |
| 7,448,137 B2 | 11/2008 | Neitzell et al. |
| 2001/0007300 A1 | 7/2001 | Svejkovsky et al. |
| 2002/0138991 A1 | 10/2002 | Tachibana et al. |
| 2003/0009888 A1 | 1/2003 | Marinkovich et al. |
| 2003/0051352 A1 | 3/2003 | Clark, Jr. |
| 2004/0187324 A1 | 9/2004 | James et al. |
| 2004/0231170 A1 | 11/2004 | Neitzell et al. |
| 2006/0090348 A1 | 5/2006 | Jiao |
| 2007/0074408 A1 | 4/2007 | Zhang |
| 2008/0047150 A1 | 2/2008 | Phillips et al. |
| 2008/0189961 A1 | 8/2008 | Oberheim |

FOREIGN PATENT DOCUMENTS

| | | |
|---|---|---|
| EP | 1031395 | 8/2000 |
| EP | 1203628 | 5/2002 |
| EP | 1277535 | 1/2003 |
| EP | 1593448 | 11/2005 |
| FR | 921857 | 12/1945 |
| GB | 432063 | 7/1935 |
| GB | 2256905 | 12/1992 |
| GB | 2340438 | 2/2000 |
| GB | 2415661 | 1/2006 |
| WO | WO 00/21707 | 4/2000 |

* cited by examiner

LINKAGE DRIVE MECHANISM FOR A
RECIPROCATING TOOL

This patent application is a continuation in part of U.S. patent application Ser. No. 11/707,196, filed on Feb. 13, 2007, now U.S. Pat. No. 7,814,666 issued Oct. 19, 2010, entitled "Linkage drive mechanism for a reciprocating tool.

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner.

Reciprocating tools such as jigsaws, saber saws, as well as larger reciprocating saws are typically driven by the rotating output shaft of an electric motor. Such tools have a mechanism that translates rotary motion of the output shaft into reciprocating motion. With the recent emphasis on tool portability, drive motors are increasingly powered by rechargeable battery packs, and even relatively large reciprocating saws are now being powered by such battery packs. Because larger saws are often used for heavy duty jobs, it is important for the run time of the batteries between charges be sufficient that the user does not have to frequently change out and recharge the battery packs while working. Therefore, it is important that the design of such tools contributes to efficient operation.

Typical reciprocating saws have a plunge rod or plunger that is guided in its reciprocating movement by sliding in metal guide bushings. One of the bushings is nearly always located at the very front of the saw and is exposed to dust and debris during operation of the saw. The front bushing typically becomes loaded with dirt and also receives very little grease. Generally, poor lubrication combined with the high coefficient of friction that sliding bushings typically have, results in considerable friction heating and power loss. Sliding plunge rod action in guide bushings typically wastes 50% or more of the power used in operation because of the sliding friction. If the design is one that has counterweights to reduce vibration, such counterweights are also often designed to slide in steel guide bushings. This therefore increases waste of energy and accordingly, most commercially available battery powered reciprocating saws at the present time simply do not have counterweights. This is undesirable because the absence of counterweights substantially increases the vibration that is experienced by a user during operation.

There has also been much research and development over the years in attempting to improve the cutting efficiency of such reciprocating saws and this has been achieved by introducing an orbital path of movement for the blade as it performs its cutting stroke as well as its return stroke. Such orbital as have the effect of increasing the force that is applied to the blade during its cutting operation. The amount of orbital action can often be varied by manipulation of a control mechanism associated with the tool, so that efficient cutting can be done. The adjustment of the amount of orbital action or variation of the cut path can be made to more efficiently cut both hard and soft materials. It is generally known that existing orbit systems work better in soft materials than they do in hard materials. For this reason, saws are provided with orbit on-off switches. Knowing when to turn the orbital action on or off and remembering to do so can lead to confusion by users.

Existing orbit mechanisms create a motion path that is related to the position of the plunger. The position of the plunger or plunger rod can be described as being fully forward, fully back or at mid-stroke in general. All existing orbit mechanisms cause the blade to start moving into the work piece at the start of a cut stroke and move away from or out of the work piece during the return stroke. The amount of incremental orbit motion in typical commercially marketed orbit systems is nearly constant during the entire cut stroke and the return stroke. The orbit path also can be said to be nearly symmetrical with respect to the cutting and return strokes.

These conventional orbit systems work well when cutting soft materials such as wood. However, when cutting hard materials such as steel, pipe or steel plate, conventional orbit systems have important drawbacks. Conventional orbit mechanisms apply orbital action at the start of a cut stroke. The orbital action often causes the blade to bounce on the material at the beginning of the cut stroke which delays good establishment of the blade teeth in the material for a portion of the cut stroke thereby reducing cutting effectiveness.

Mechanisms that can create substantial nonlinear orbit paths for aggressive orbit paths and end strokes with conventional orbit drive systems have often experienced significant mechanical limitations. These are typically cam systems that have linear motion which is basically symmetric about a mid-stroke position, with the cut stroke being one near linear path and the return stroke as another near linear path. These two paths are offset from each other by a small amount.

To date, no known attempts been made to create asymmetric or highly nonlinear paths. Attempts have been made to create a more aggressive orbit using cam drives. However, this results in very high cam follower loads which create high friction and wear in the cam elements. Another wear problem that occurs when the cam is aggressively shaped is that the cam follower can lift off of the cam. This produces a lack of contact between the cam and the cam follower for a major portion of the cam rotation. This is called cam float and is a common problem in high-speed cams. Floating results in loss of the force pushing the blade into the work piece. In especially aggressive cams, it can require several revolutions of the cam before the follower comes back down into contact with it. The loss of cam to cam follower contact then leads to the loss of contact force between the saw blade and the work piece and reduces the cutting rate instead of increases it.

There have been cam systems where the orbit actuation cycle of down and up is shared by two cams. However, having aggressively shaped cams is expensive because of the necessity of matching two cam profiles with a high degree of precision and the attendant wear problem still exists. Similar problems of high forces arising with aggressive orbits arise when trying to use adjustable angled slots with their associated slot followers. The forces that are experienced can be very high, even if the track is straight and too much orbital action will lead to high forces on the track follower. Since much of the action of a track follower involves sliding, high friction and wear are also a problem.

SUMMARY OF THE INVENTION

One preferred embodiment of the present invention is a drive apparatus for a reciprocating tool that comprises a housing, a rotatable drive shaft assembly located in the housing an elongated plunger located in the housing for reciprocating motion, the plunger having a front end portion for attaching a tool thereto, a rotary joint rocker mechanism supported in the housing and operatively connected to the plunger and the drive shaft assembly so that rotation of the drive shaft assembly produces reciprocating motion of the plunger.

Another preferred embodiment is a drive apparatus for a reciprocating tool that comprises a housing, a rotatable drive shaft assembly located in the housing, an elongated plunger located in the housing for reciprocating motion, the plunger having a front end portion for attaching a tool thereto, a rotary joint rocker mechanism having an associated counterweight supported in the housing and operatively connected to the plunger and the drive shaft assembly so that rotation of the drive shaft assembly produces reciprocating motion of the plunger along a first desired path and reciprocating motion of the counterweight along a second desired path, the reciprocating motion of the counterweight being in an opposite direction of the reciprocating motion of the plunger to reduce vibration produced during operation of the apparatus, the mechanism producing motion of the plunger and counterweight along their respective desired paths without incurring any sliding friction being produced in the mechanism.

DETAILED DESCRIPTION

The preferred embodiments of the present invention are reciprocating drive mechanisms for a reciprocating tool such as a reciprocating saw, the general size and shape of which is similar to saws that are currently marketed. The present invention is also applicable for other types of tools such as saber saws, for example, or other types of tools that have a reciprocating action and are powered by a motor having a rotating output shaft.

A preferred embodiment of the present invention provides a reciprocating drive mechanism that utilizes a progressive nonlinear cut path as opposed to a traditional orbital path. The progressive cut path does this by using a nonlinear cut path that starts each cut with little contact force or a slightly negative contact force due to the blade lifting out of the work piece in which it is engaged and then applies a gradually increasing contact force through the cutting stroke. This prevents bouncing on hard materials at the beginning of the cut stroke and allows the blade teeth to establish good engagement with the material. Then the contact force is increased through the mid-stroke to approximately one third of its maximum value. Toward the end of the cutting stroke, as the plunger is slowing down as part of its sinusoidal cycle, the cut stroke is more aggressively increased to its full value. The aggressive increase of the cut stroke at the end of the cut stroke makes better use of a portion of the cutting cycle where there is usually a drop off in cutting due to the fact that the plunger is slowing down.

So this type of nonlinear path improves the action of the cutting stroke by reducing bouncing of the blade on the work piece at its beginning because it has very little contact force initially. Also, at the end of the cut stroke, embodiments of the present invention compensates for a slowing plunger with an aggressive cutting path.

The above operability is carried out using a drive mechanism that has far fewer parts and improved durability compared to existing mechanisms that provide orbital action. The progressive nonlinear motion is created by the action of a coupler link and a four bar mechanism that does not have any sliding interaction of components of the type which experiences wear and generates energy consuming heat.

As previously mentioned, because most commercially available reciprocating saws utilize a plunge rod that is guided in bushings, wherein sliding friction can consume 40% to 50% of the motor power. Sliding friction of counterweights in similar bushings can consume another 15%-20% of the motor power. Such sliding friction also causes the saw mechanism to run at higher temperatures which has the attendant effect of decreasing the life of lubricating grease in the tool and therefore decreasing the tool life.

The preferred embodiments of the present invention that are shown and described herein do not utilize guide bushings for guiding either the plunge rod or a counterweight if the preferred embodiment has a counterweight. The preferred embodiments shown and described herein utilize linkage mechanisms that have pivot connections rather than sliding components. There are significant multiple advantages including a longer run times for saws that are powered by battery packs, smaller and less expensive motors that can run at higher speeds at cooler temperatures and demonstrated improved durability. The tools can also have reciprocating counterweights that substantially reduce the amount of vibration that is generated during operation of the saw.

By employing a guide rod guiding mechanism that utilizes linkage mechanisms with needle bearings rather than poorly lubricated guide bushings, saw power consumption can be reduced by approximately 45% which leads to an approximately 80% increase in run time for a cordless, i.e., battery pack driven saw. Lowering the generated friction also lowers the operating temperature of the tool and thereby increases the comfort of the user. Significantly, linkage driven reciprocating saws can also employ counterweights with very little power loss for the reason that the counterweights are also guided by linkage mechanisms and do not require slide bushings in their design. It is expected that impending revised vibration standards will be implemented for various tools, including reciprocating saws, in the near future which will likely not be met without the employment of counterweights in their design.

While the preferred embodiments illustrated herein employ a rotatable drive shaft assembly that has an input shaft from a motor that has a pinion gear that drives a spiral gear and associated crank arm, with the crank arm driving a connecting rod to a rotary joint rocker mechanism, it should be understood that other types of rotatable drive shaft assemblies can be used, such as a scotch yoke drive, a barrel cam, gear drive or wobble arm drive, all of which are known to those of ordinary skill in the art.

Figure 1:
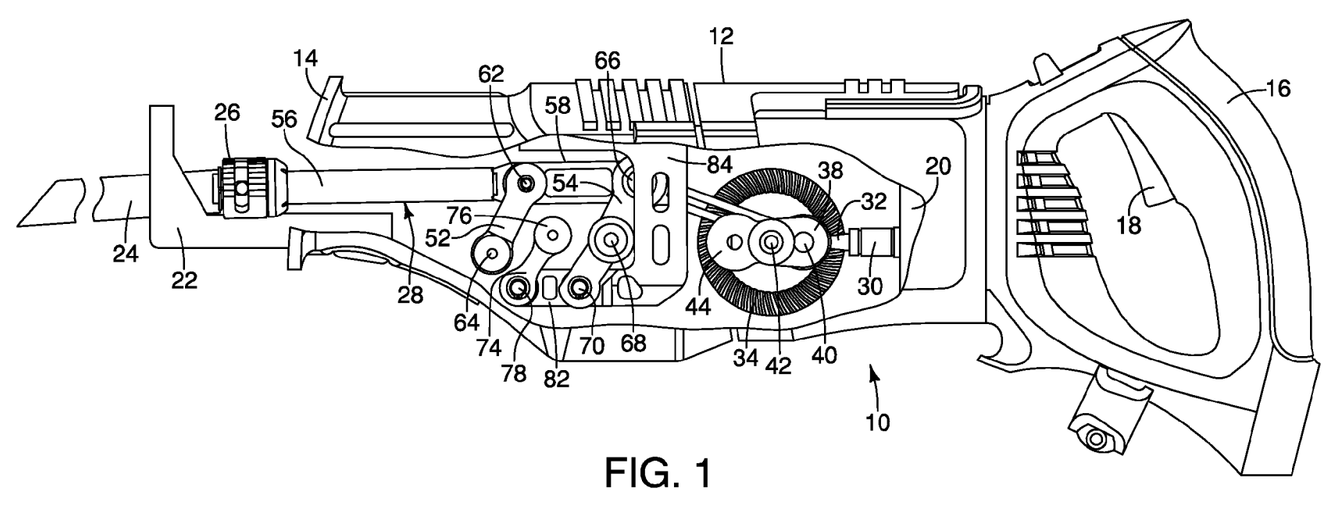
FIG. 1 is a side view of a preferred embodiment of the present invention incorporated into a relatively large reciprocating saw and is shown with portions of the housing cut away to reveal the construction of the embodiment.

Turning now to the drawings, as shown in FIG. 1, a reciprocating saw, indicated generally at 10, has an outer housing 12 which includes a nose portion 14 and a rear handle 16. A trigger switch 18 is provided in the handle portion for turning on a motor 20 that drives the tool. The saw has a shoe 22 at the nose end portion 14 and a saw blade 24 is mounted in a blade clamping mechanism 26 that is mounted at the end of an elongated plunger, indicated generally at 28. The motor 20 has an output shaft 30 to which a pinion gear 32 is attached, and it engages and drives a spiral gear 34.

Figure 3:
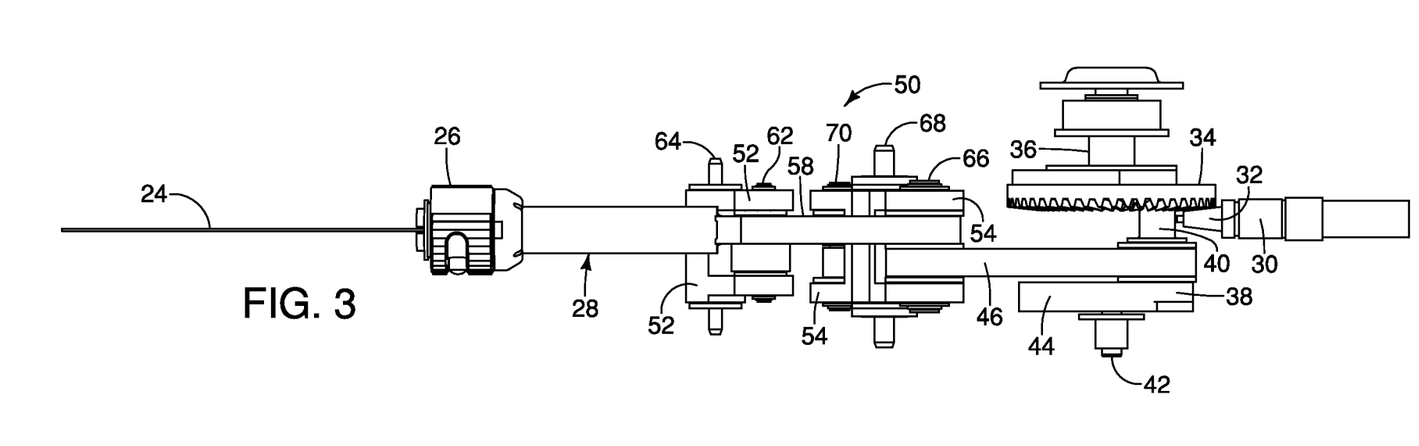
FIG. 3 is a top view of another preferred embodiment of the present invention.
Figure 4:
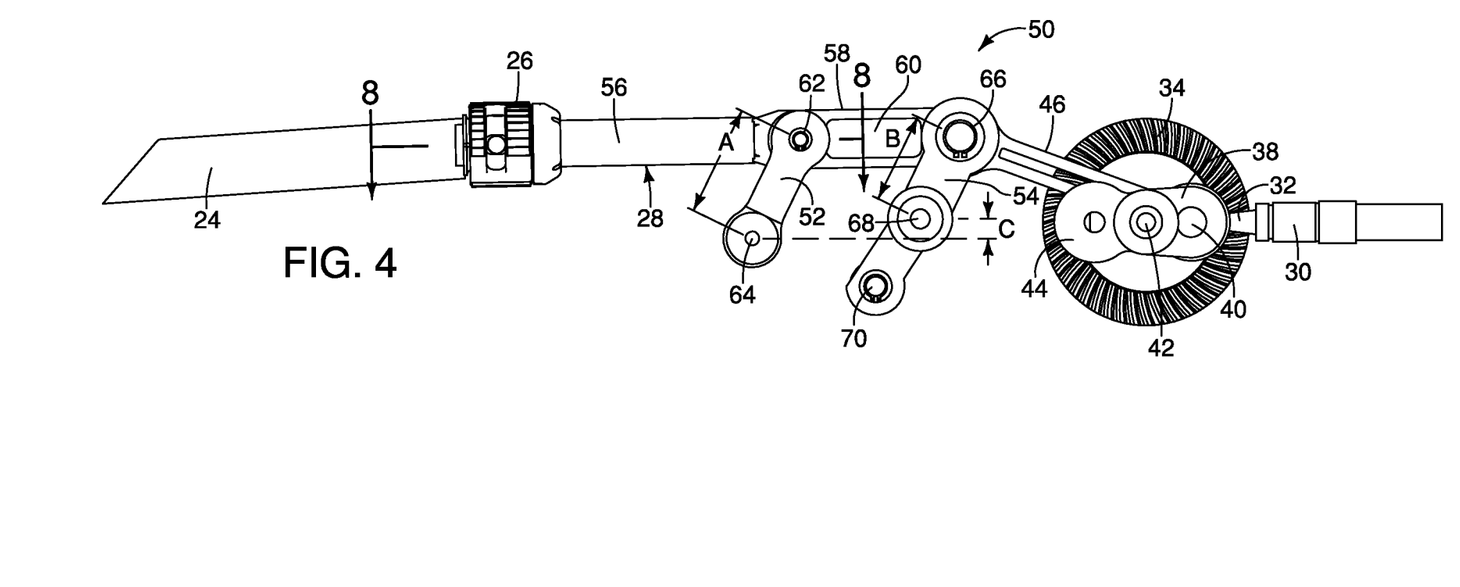
FIG. 4 is a side view of the embodiment shown in FIG. 3.

As is best shown in FIGS. 3 and 4, the spiral gear 34 is mounted on shaft 36 and is also connected to a crank arm 38 by a post 40 so that the crank arm rotates with the spiral gear 34. The crank arm 38 is mounted for rotation on a shaft 42. The crank arm has a second lobe portion 44 that is provided on the end opposite the end having the post 40 for the purposes of balancing the crank arm. The post 40 also acts as a pivot for a connecting rod 46 that is pivotally connected to the post 40 and provides the output to a rotary joint rocker mechanism, indicated generally at 50.

The rotary joint rocker mechanism 50 is comprised of a forward plunger guide rocker 52 and a plunger drive rocker 54 that is spaced rearwardly from the plunger guide rocker 52. The plunger 28 has a cylindrical portion 56 to which the clamping mechanism 26 is attached and it also has a relatively flat rear portion 58 with a weight reducing window 60. The plunger guide rocker 52 has a upper pivot connection 62 that interconnects the upper end portion of the rocker 52 to the rear portion 58 of the plunger 28 and a lower pivot connection 64 that connects the bottom portion of the plunger guide rocker 52 to the housing 12.

Figure 2:
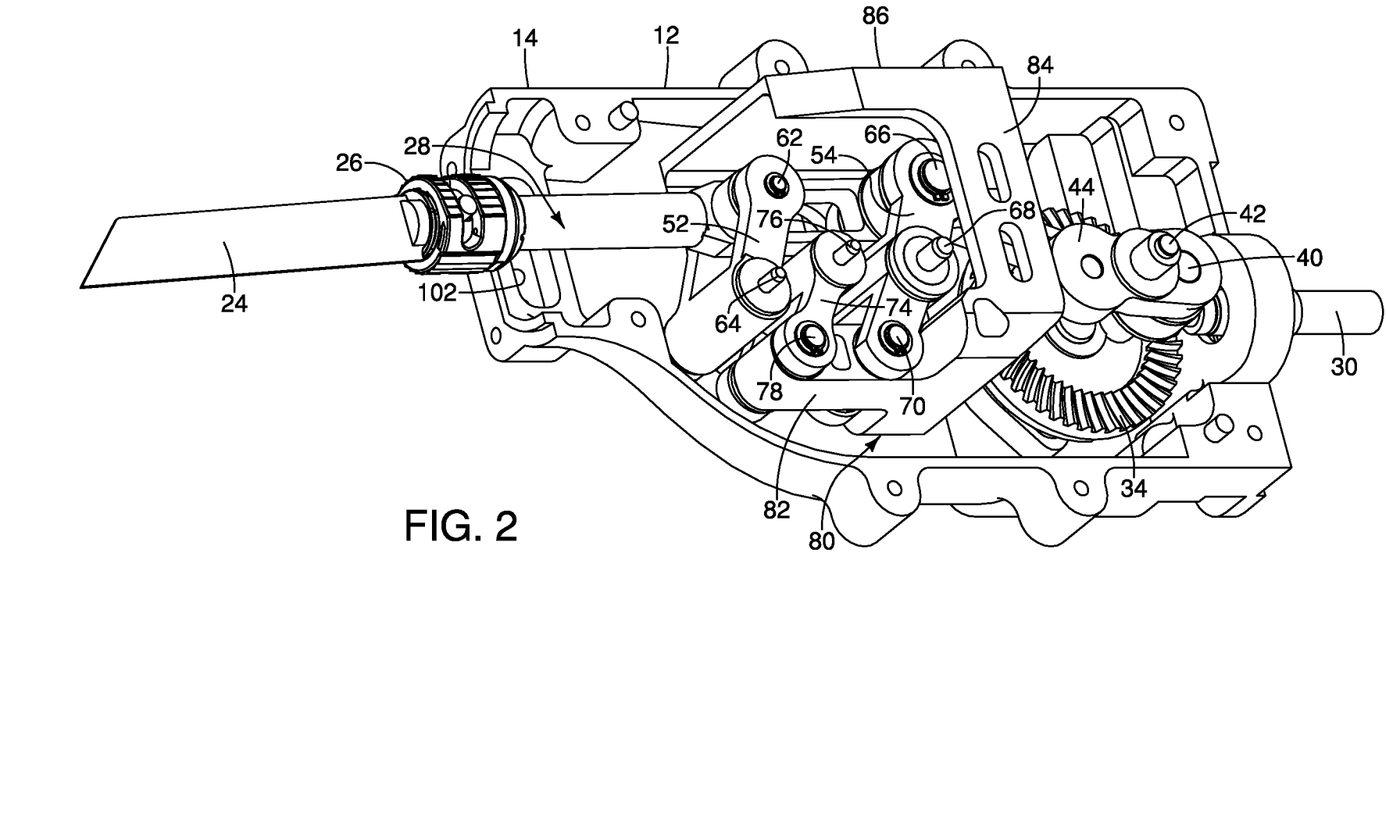
FIG. 2 is a left side perspective view of the preferred embodiment shown in FIG. 1.

The plunger drive rocker 54 has an upper pivot connection 66 which connects the drive rocker to the rear portion 58 of the plunger 28 as well as to the outer end of the connecting rod 46. The plunger drive rocker 54 has a pivot connection 68 generally midway between its upper and lower end portions which is also connected to the housing 12. Additionally, the plunger drive rocker 54 has a lower pivot connection 70 that is not shown to be connected to anything in this embodiment but which is connected to part of a counterweight assembly which is provided in the embodiment shown in FIGS. 1 and 2 and which will be hereinafter described.

From the foregoing, it should be understood that rotation of the spiral gear 34 causes the crank arm 38 to rotate which results in the connecting rod 46 moving the plunger drive rocker 54 from the position shown in FIG. 4 to the left and thereby causes the plunger 28 to be moved to the left. The saw blade 24 is therefore moved in a reciprocating manner with the stroke of movement preferably being approximately 1" to approximately 1¼", the stroke distance being a function of the distance between the center of the post 40 and shaft 42.

During reciprocating motion of the plunger 56, the configuration of the rotary joint rocker mechanism provides a nonlinear movement of the blade 24 during operation. As is known to those of ordinary skill in the art, the nonlinear action aids in cutting a work piece during operation. The amount of such action varies as the orientation and length (i.e., the distance between pivot connections, marked as A and B in FIG. 4) of the rockers 52 and 54 are changed relative to one another. As is also evident from FIG. 4, the elevation of the pivot connection 68 is higher than the pivot connection 64 by an amounted marked as "C" in FIG. 4. This elevation difference as well as changes in the distances A and B can alter the path of nonlinear motion of the blade. The interaction of these dimensions is complex and the exact path of the blade 24 can be varied by changing the dimensions of these distances relative to one another.

Also, it is possible to change the path by moving the pivot connection 64 to the left or right or up and down from the location that is shown in FIG. 4, as well as varying the distance between the pivot connections 62 and 66. The pivot connection 64 is shown in this embodiment to be secured in the housing 12, but it is within the scope of the invention to provide a linkage secured in the housing that enables the position of the pivot connection 64 to be changed by a lever or the like which would increase or decrease the amount or orbital motion that is carried out by the rotary joint rocker mechanism 50.

Figure 13:
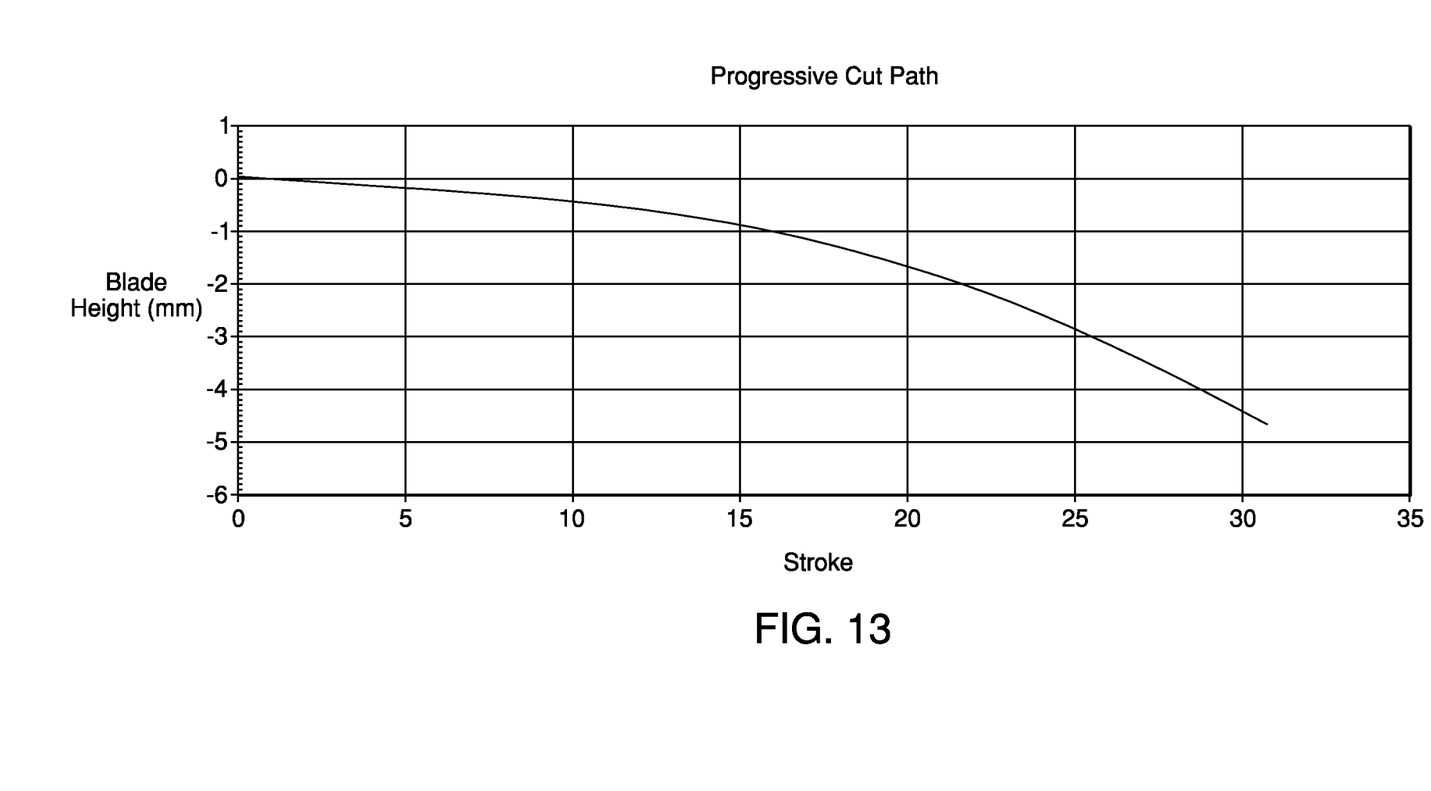
FIG. 13 is a chart of the nonlinear movement of the blade attached to the preferred embodiment of the present invention as it moves through its cutting stroke.

If the plunger is moved from its leftmost position (not shown) to the right position as shown in FIG. 4, for example, the elevation of the rocker point B will decrease and this displacement during a cutting and return stroke is shown in the chart on FIG. 13.

As is evident from the chart, the blade height of zero is defined as when it is in its leftmost position which is not shown. When it is moved to the right, it will cause the blade to move into the work piece, by the blade applying a small initial force through a first portion of the stroke, followed by an increased force for the second portion of the stroke. For the chart shown in FIG. 13, the first portion comprises approximately 60 percent of the complete cutting stroke of approximately 28 millimeters, and the second portion is about 40 percent. As indicated by FIG. 13, the blade would penetrate into a wood work piece about 4 to 5 mm, and specifically about 4.7 mm which produces fast cutting, without any significant bouncing of the blade.

Since it moves through the path of movement as shown in FIG. 13, it is evident that it does not exhibit a true orbital path of movement, but one that is nonlinear and progressive. The degree of progressiveness can be changed by the geometry of the mechanism. More particularly, if it is desired to have a less progressive cut, i.e., one which has a shallower path, such as moving from 0 through −1 millimeters, for example, this can be achieved by increasing the length A of the front rocker 52 so that the lower pivot point 64 is below the pivot 68 of the rocker mechanism 50. This can be done by modifying the configuration of the housing to lower the lower pivot connection 64.

Figure 5:
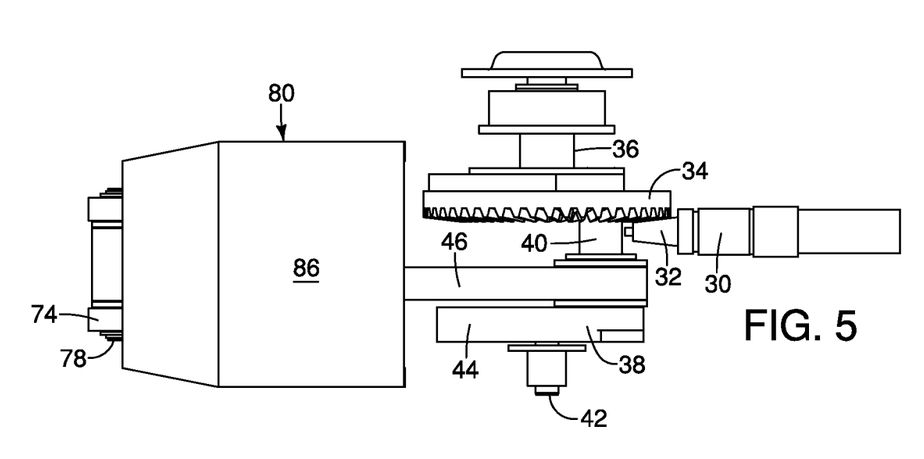
FIG. 5 is a top view of a portion of the preferred embodiment shown in FIG. 1.
Figure 6:
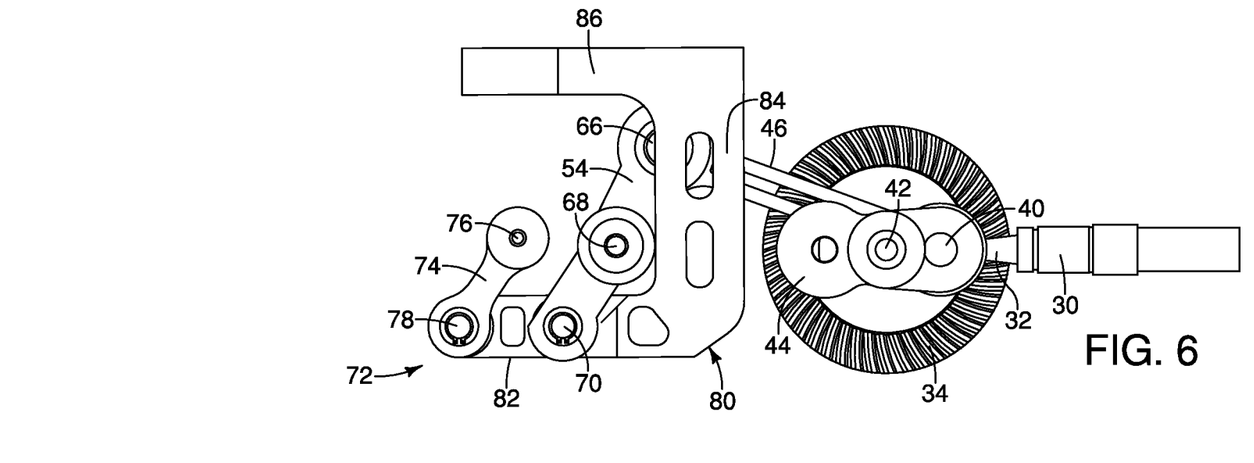
FIG. 6 is a side view of the portion of the embodiment shown in FIG. 5.
Figure 7:
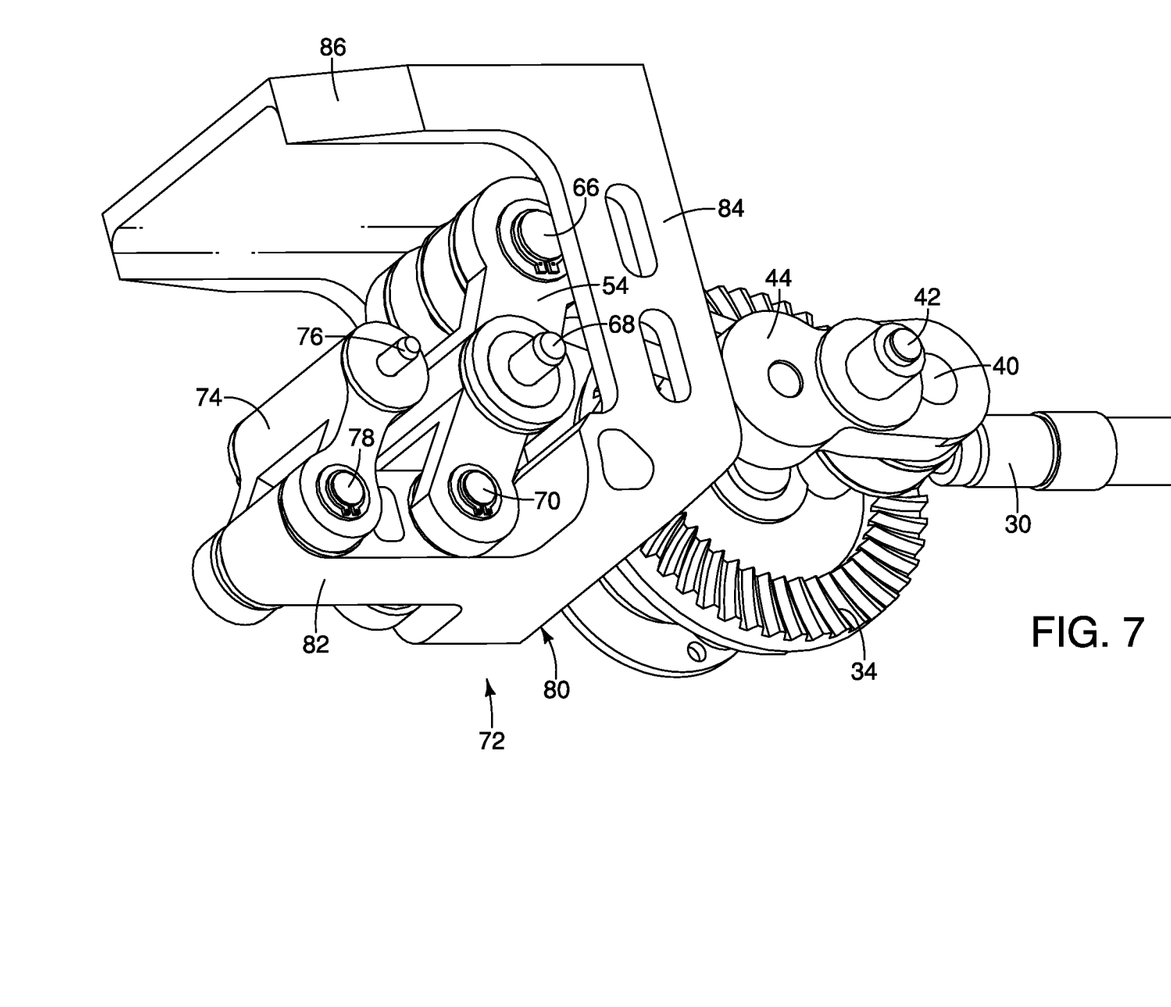
FIG. 7 is a side perspective view of the portion of the preferred embodiment shown in FIGS. 5 and 6.

It is preferred that zero is the start point and that the blade height generally extends downwardly in a curved manner with the amount of curvature being a function of the relative lengths of the rockers 52 and 54. The embodiment of FIG. 1 is also illustrated in FIGS. 5, 6 and 7 which has a counterweight assembly, indicated generally at 72, and comprises a counterweight guide rocker 74 having an upper pivot connection 76 and a lower pivot connection 78, with the upper pivot connection 76 being connected to the housing 12. The lower pivot connection 78 is connected to a counterweight structure, indicated generally at 80, that has a bottom tongue portion 82 that is connected to the guide rocker 74 as well as the lower portion of the plunger drive rocker 54. The counterweight structure 80 extends rearwardly (to the right as shown) and has an enlarged opening defined by sidewall portions 84 that extend upwardly to a top portion 86. The opening is large enough that the counterweight structure 80 surrounds but does not interfere with the operation of the rotary joint rocker mechanism 50. The counterweight structure 80 also extends forwardly over the tongue portion 82.

Importantly, the counterweight structure 80 is supported only by pivot connections 70 and 78 which guide the counterweight structure 80 in a reciprocating path that is opposite that of the plunger 28. The configuration of the counterweight structure 80 provides inertia forces that are approximately equal to those that are generated by the plunger mechanism 50 which will substantially reduce vibration during operation. Also, the counterweight structure 80 is also configured so that the distribution of mass provides a center of mass that is approximately in line with the plunger axis which also contributes to the reduction in vibration to a user. Since there is no sliding contact by the counterweight structure, there is very little waste of energy caused by friction.

Figure 8:
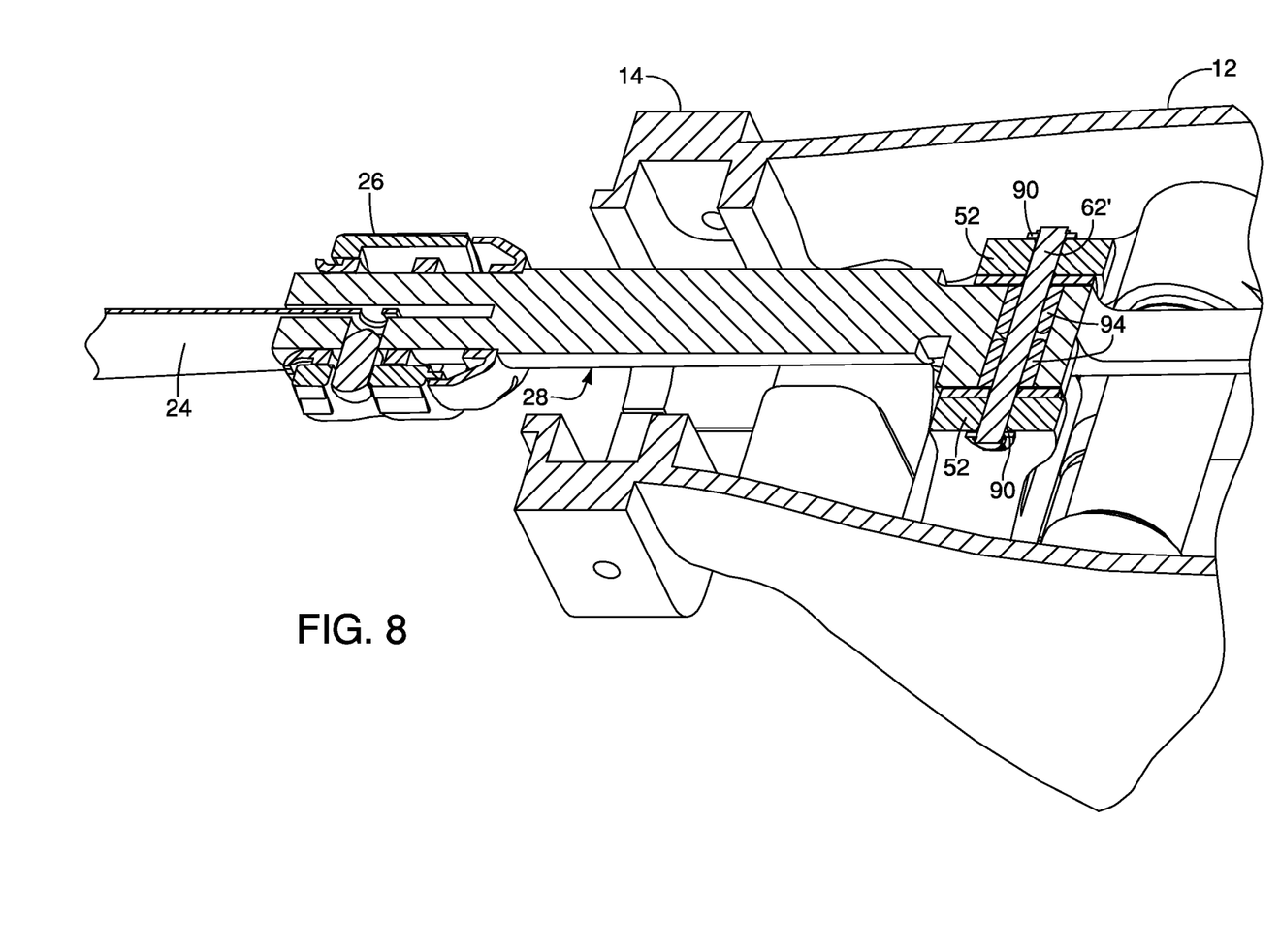
FIG. 8 is a perspective of a portion of the preferred embodiment shown in FIG. 1, partially in section (without section lines being shown) taken generally along the line 8-8 of FIG. 4 to illustrate the construction of a front pivot connection.
Figure 9:
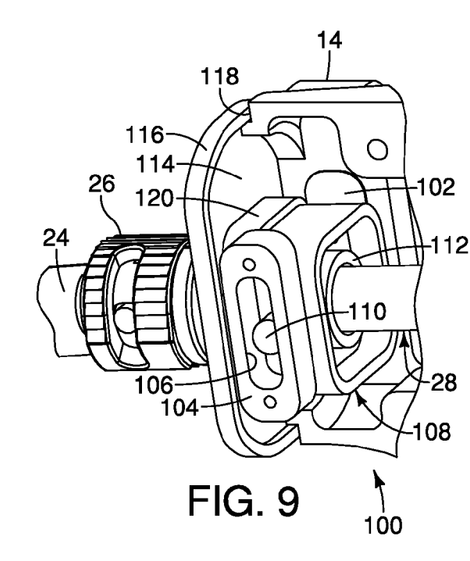
FIG. 9 is an enlarged perspective view of the front end portion of the housing shown in FIG. 2 and including components of the sealing assembly.
Figure 10:
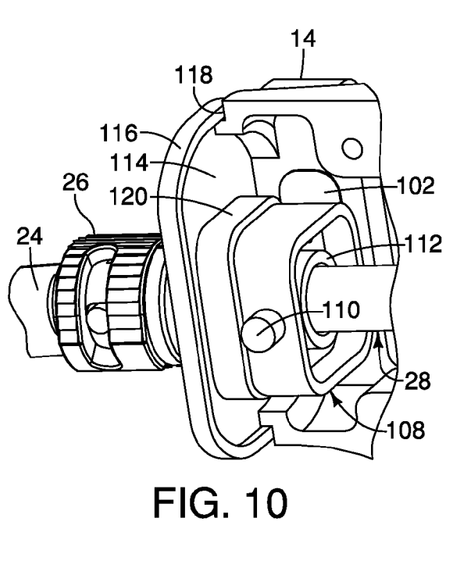
FIG. 10 is another view similar to FIG. 9, but with a guide channel removed.
Figure 11:
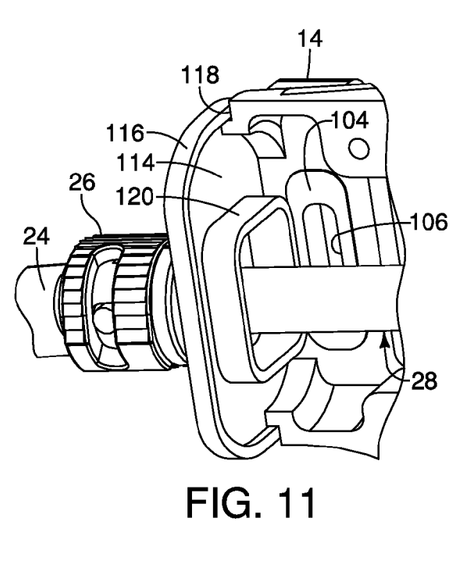
FIG. 11 is another view similar to FIG. 10 with a seal block removed.

The only substantial friction that is experienced is in the pivot connections and that is minimized by the preferred use of needle bearings in the pivot connections. There is a very small amount of friction in the side washers on either side of the rocker and a very small amount of friction in the lip seal. In this regard and referring to FIG. 8 which is a perspective view of a cross section taken generally along the line 8-8 of FIG. 4 through the center of the plunger 28 and the pivot connection 62, there is shown a shaft 62' that is snugly fit in apertures 88 on both sides of the plunger guide rocker 52. The outer ends of the shaft 62 are retained by snap rings 90 and the plunger 28 has an enlarged opening 92 in which a pair of needle bearings 94 are located.

The needle bearings greatly reduce any friction and can withstand relatively high loading forces. While all of the pivot connections that have been described preferably have at least one needle bearing, it is preferred that two needle bearings be used in the pivot connection 62 which is at the forward end of the plunger 28. When the reciprocating saw is being used to cut a circular hole, for example, there may be a torque applied to the blade 24 and therefore to the plunger 28 and the use of two needle bearings in this pivot connection resists the twisting of the plunger 28 which is desired to minimize the potential damage to the rotary joint rocker mechanism 50.

Alternatively, the rotary joint needle bearings can be replaced by compliant joint mechanisms, which are generally similar to thin extremely durable leaf springs. Their use in a rotary joint rocker mechanism such as disclosed in the illustrated embodiments shown and described herein would be possible because the angular rotation of the rockers disclosed herein are within approximately plus or minus 20 degrees of movement which can be achieved with such compliant joint mechanisms. An advantage of their use is that they are essentially immune to the effects of dirt and grime and do not have to be lubricated.

As is best shown in FIGS. 9-12, the nose portion 14 of the housing 12 has a sealing assembly, indicated generally at 100. The nose portion 14 has two recessed portions, one of which is shown at 102 in the illustrated half of the housing 12, each of which is configured to receive a guide channel 104 which has an internal slot 106 which is configured to receive a portion of a seal block, indicated generally at 108, which is preferably made of a nylon or other strong plastic-like material. The seal block 108 has a generally square outer configuration with rounded corners, and the opposite sides thereof have a generally cylindrical protrusion 110 that is sized to fit within the slot 106 of the guide channel 104.

The seal block 108 has a cylindrical center portion 112 with an inside opening that is only slightly larger than the diameter of the plunger 28. Because the plunger 28 travels along an orbital path during operation, the seal block 108 is mounted in the nose portion 14 of the housing in a manner whereby the seal block can vertically move as well as pivot about the protrusions 110 located on each side of the seal block 108. The amount of vertical movement that can occur is a function of the length of the slot 106 in the guide channel 104, and that length is determined so that the seal block 108 does not constrain or otherwise bind the orbital movement of the plunger 28.

An elastic diaphragm 114 is also provided and it forms a static seal between the housing and the seal block 108. The diaphragm 114 is preferably made of silicon rubber but may be some other elastic material so long as it has the necessary flexibility and durability over time. The diaphragm 114 has an outer annular flange 116 that fits in a complementary shoulder 118 in the nose portion 14 and the overall configuration of the diaphragm 114 is rectangular with rounded corners as is evident. The diaphragm 114 also has an inner annular flange 120 that is slightly larger than the outside configuration of the seal block 108 so that it can slide onto the seal block 108 to form a static seal with the seal block 108. The flexibility of the diaphragm 114 is necessary so that it can move when the seal block 108 moves in response to orbital reciprocating action of the plunger 28.

Figure 12:
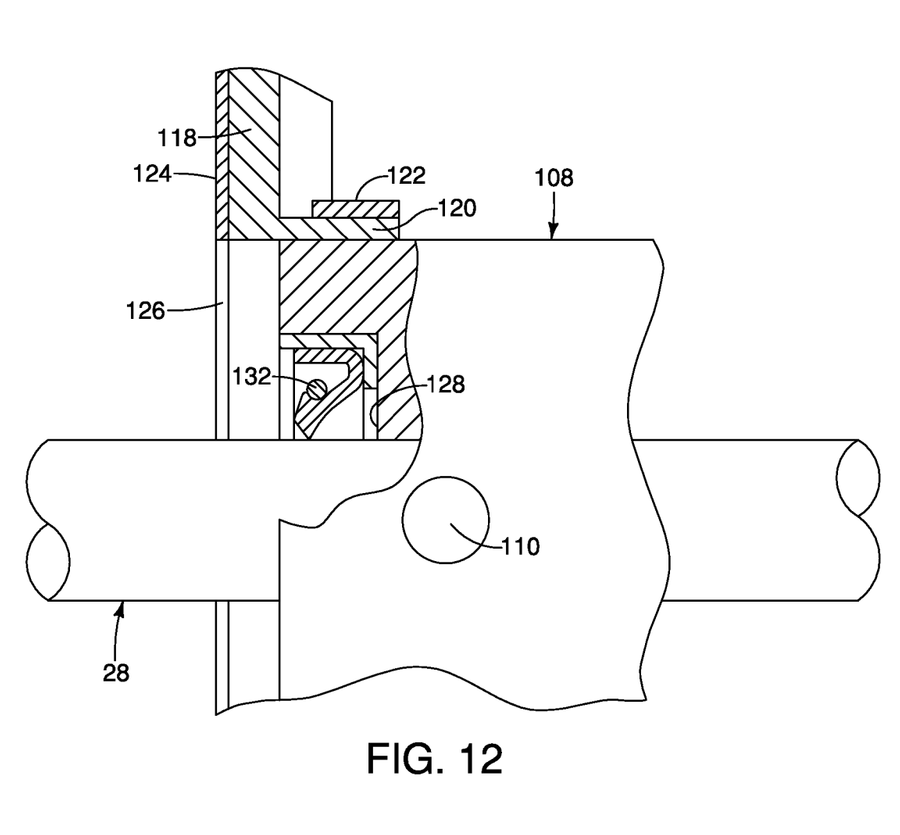
FIG. 12 is an enlarged side view of a portion of the sealing assembly shown in FIG. 9 with portions cut away to illustrate details of the construction of the sealing assembly.

As shown in FIG. 12, an outer band clamp 122 is used to hold the flange 120 in sealing engagement with the seal block 108. It is preferred that a metal plate 124 be provided to overlay the diaphragm 114, with the plate 124 having an opening 126 that is generally coextensive with the size of the seal block 108 so that the metal plate does not interfere with the movement of the plunger 28. The plate 124 is preferably rectangular and does not have the rounded corners as does the diaphragm 114 so that fasteners such as screws or the like can be used at the four corners to attach the metal plate to the nose portion 14 of the housing 12. By this construction, there are no screws or the like that penetrate the diaphragm 114 which could damage it and reduce its useful life.

The front portion of the seal block 108 has an annular recess 128 that contains a lip seal 130 that contacts the plunger 28. An annular spring 132 is provided to bias the lip seal 130 into contact with the plunger 28 to provide a dynamic seal for the plunger 28.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A drive apparatus for a reciprocating tool, comprising;
   a housing;
   an elongated plunger located in said housing for reciprocating motion, said plunger having a front end portion for attaching a cutting blade thereto;
   a rotatable drive shaft assembly located in said housing, said drive shaft assembly including a drive shaft and a connection arm operatively and directly connected to a rear portion of said plunger, wherein a rotation of said drive shaft causes said connection arm to move in a reciprocating motion along a lengthwise direction of said connection arm to apply a force on said plunger to thereby reciprocate said plunger generally in a lengthwise direction of said plunger during alternating cutting and return strokes; and a rotary joint rocker mechanism supported in said housing and operatively connected to said plunger and said drive shaft assembly so that a rotation of said drive shaft assembly produces a reciprocating motion of said plunger;

said rotary joint rocker mechanism including;

a front rocker with a lower pivot connection to said housing and an upper pivot connection to said plunger;

rear rocker with an upper pivot connection to the rear portion of said plunger and a lower pivot connection to said housing;

a counterweight assembly having a movable counterweight, said mechanism being configured to support and move said counterweight in a reciprocating motion that is substantially in the opposite direction of said plunger, wherein said second rocker has a lower extension below said lower pivot connection with a counterweight pivot connection to said counterweight; and a third rocker having one end portion having a pivot connection to said counterweight spaced from said counterweight pivot connection of said second rocker, an opposite end portion of said third rocker having a pivot connection to said housing.

2. The drive apparatus for a reciprocating tool as defined in claim 1, wherein:

said housing includes at least one handle portion at its rear end;

a motor is disposed in the housing for driving said drive shaft;

said pivot connections of said front rocker configured for maintaining the orientation of the plane of the blade substantially constant during said reciprocating motion;

said connection arm is configured so that said cutting stroke moves toward said handle portion and said return stroke moves away from said handle portion, wherein a distance between said upper and lower pivot connections of said front rocker is greater than a distance between said upper and lower pivot connections of said rear rocker, so that said predetermined path is non-linear and produces a progressive cutting pattern wherein an attached blade progressively engages a subject work piece with a small force at the beginning of said cutting stroke and an increased force as said plunger is moved through the remainder of said cutting stroke.

3. The drive apparatus as defined in claim 2 wherein an attached blade moves transversely relative to the longitudinal direction of the blade a maximum distance of about 4 to about 5 millimeters when the blade is traversed through a cutting stroke distance of about 30 millimeters.

4. The drive apparatus as defined in claim 2 wherein a distance from said lower pivot connection of said front rocker to a longitudinal center line of said plunger is greater than a distance from said lower pivot connection of said rear rocker to said longitudinal center line of said plunger.

5. The drive apparatus for a reciprocating tool of claim 1 wherein a distance between said upper and lower pivot connections of said front rocker is greater than a distance between said upper and lower pivot connections of said rear rocker, so as to produce a path of movement of an attached cutting blade that is effective to apply a progressive non-linear cutting force to a work piece during said cutting stroke.

6. The drive apparatus as defined in claim 5 wherein a distance from said lower pivot connection of said front rocker to a longitudinal center line of said plunger is greater than a distance from said lower pivot connection of said rear rocker to said longitudinal center line of said plunger.

7. The drive apparatus as defined in claim 6 wherein said progressive non-linear cutting force increases during said cutting stroke.

8. The drive apparatus as defined in claim 6 wherein said path of movement that applies said progressive orbital cutting force comprises a first cutting stroke interval of movement where a minimal contact force is applied, followed by a second stroke interval of movement when an increased contact force is applied.

9. The drive apparatus as defined in claim 8 wherein said first cutting stroke interval of movement comprises approximately 60 percent of the cutting stroke length.

10. The drive apparatus as defined in claim 6 wherein said path of movement applies a small contact force through a first portion of said cutting stroke and a larger contact force through a second portion of said cutting stroke.

11. The drive apparatus as defined in claim 10 wherein said first portion is approximately 60 percent of the total cutting stroke.

12. The drive apparatus for a reciprocating tool as defined in claim 6 wherein said rocker mechanism further comprises a counterweight assembly having a movable counterweight, said mechanism being configured to support and move said counterweight in a reciprocating motion that is substantially in the opposite direction of said plunger.

13. The drive apparatus as defined in claim 1 wherein said cutting stroke occurs when said blade is moved toward the rear of said housing.

14. The drive apparatus for a reciprocating tool as defined in claim 1 wherein said drive shaft assembly comprises a rotatable crank arm non-rotationally connected to a spiral gear that is driven by a drive pinion gear, said crank arm being connected to a connecting arm that is operatively connected to said plunger, whereby rotation of said pinion gear rotates said spiral gear and crank arm and causes said connecting arm to move said plunger in reciprocating motion.

* * * * *